United States Patent [19]
Matsuo et al.

[11] Patent Number: 5,791,299
[45] Date of Patent: Aug. 11, 1998

[54] SMALL ONCE-THROUGH BOILER

[75] Inventors: Mamoru Matsuo; Ryoichi Tanaka, both of Kanagawa; Kazuhisa Mitani, Aichi-ken, all of Japan

[73] Assignees: Nippon Furnace Kogyo Kabushiki Kaisha, Kanagawa; Toyota Jidosha Kabushiki Kaisha, Aichi-ken, both of Japan

[21] Appl. No.: 788,544

[22] Filed: Jan. 24, 1997

[30] Foreign Application Priority Data

Jan. 26, 1996 [JP] Japan .................... 8-011639

[51] Int. Cl.$^6$ .................... F22B 23/06; F22B 37/10
[52] U.S. Cl. .................... 122/367.1; 122/6 A; 110/254
[58] Field of Search .................... 122/367.1, 367.2, 122/367.3, 6 A; 110/254

[56] References Cited

U.S. PATENT DOCUMENTS

| | | | |
|---|---|---|---|
| 3,509,834 | 5/1970 | Rosenberg et al. | 110/254 |
| 4,453,496 | 6/1984 | Yoshinari | 122/6 A |
| 5,522,348 | 6/1996 | Tanaka et al. | 122/367.1 |

FOREIGN PATENT DOCUMENTS

WO9305343  3/1993  WIPO.

*Primary Examiner*—Teresa J. Walberg
*Assistant Examiner*—Jiping Lu
*Attorney, Agent, or Firm*—Notaro & Michalos P.C.

[57] ABSTRACT

A small once-through boiler can avoid burning caused due to excessive heating of water pipes and burning around a fire hole of a burner in particular and heighten the heat load of a combustion chamber to further reduce the size of the system as compared with a prior art boiler. In the small once-through boiler, at least one regenerative burner system 20 is provided in a combustion chamber 1, the regenerative burner system 20 carrying out supply of combustion air A and exhaust of combustion gas E through a regenerator 22 and relatively changing flows of the combustion gas E and the combustion air A with respect to the regenerator 22 so as to supply the combustion air A via the regenerator 22 heated by heat of the combustion gas. Water pipe group 4 is provided apart from the combustion chamber wall surface 3 to form a passage 12 between the rear surface of the water pipe group 4 and the combustion chamber wall surface 3. Communicating openings 10 and 11 through which the combustion gas C passes are formed between adjacent water pipes at upper and lower ends of the water pipe group 4 so that a part of the combustion gas C can pass through the passage 12 provided at the rear of the water pipe group 4, whereby a part of the combustion gas C flows from the lower communicating openings 11 into the passage 12 to move upward and again flows from the upper communicating openings 10 into the combustion chamber 1.

19 Claims, 5 Drawing Sheets

SMALL ONCE-THROUGH BOILER

BACKGROUND OF THE INVENTION

1. Field of the Invention

The present invention relates to a small once-through boiler. More particularly, the present invention relates to improvement of a combustion chamber of a small once-through boiler.

2. Description of the Prior Art

For example, as shown in FIG. 6, a combustion chamber of a prior art small once-through boiler configures a heating surface by doubly and annularly arranging water pipes 103 and 104 inside a furnace wall (inner peripheral wall) 102 of an elongated cylindrical furnace body 101 and aims to cool down the furnace wall 102. The water pipes 103 provided on the outer side are connected with each other by fins 109 and embedded halfway in the furnace wall 102 or, although not shown, they are tightly connected with each other without fins so as to be embedded halfway or to come into contact with the furnace wall 102. Further, the water pipes 104 provided on the inner side are disposed so as to form between the water pipes 104 and the water pipes 103 a space along which exhaust gas flows. Annular arrangement of the inner water pipes 104 and the outer water pipes 103 which are connected with each other by means of the fins 109 or tightly connected with each other constitutes the space between the inner water pipes 104 and the outer water pipes 103 as a passage 105 along which exhaust gas flows. In the configuration of a combustion chamber in this boiler, the inner surface of the water pipes 104 facing a combustion chamber 110 serves as a radiant heat transfer surface, and the inner surface of the water pipes 103 facing the passage 105 and the outer surface of the water pipe 104 function as a convective heat transfer surface.

In the conventional boiler of a general type, communicating openings 106 at which the passage 105 communicates with the combustion chamber 110 are provided between the adjacent water pipes 104 disposed in the vicinity of a bottom of the combustion chamber, and exhaust openings 108 at which an exhaust means 107 communicates with the passage 105 are provided between the adjacent water pipes 103 disposed in the vicinity of a top of the combustion chamber, whereby combustion gas generated in the combustion chamber 110 is lead from the communicating openings 106 provided at the bottom of the combustion chamber to the passage 105 between the inner water pipes 104 and the outer water pipes 103 to be exhausted from the exhaust openings 108 provided at the top of the boiler. In other words, when the combustion gas generated in the combustion chamber 110 by combustion of a burner 111 is being exhausted from the communicating openings 106 at the bottom of the combustion chamber through the inner water pipes 104 and the outer water pipes 103, heat exchange is performed between the boiler water and the combustion gas by the radiant heat transfer and the convective heat transfer in order to obtain vapor. Although a flame temperature and furnace heat load are high in the radiant heat transfer portion, heat of the combustion gas can not be sufficiently utilized only in this portion. The exhaust gas temperature is therefore extremely heightened and the influence of the heat on the circumferential environment becomes large, which deteriorates the heat economy of the boiler. The large convective heat transfer portion is therefore provided together with the radiant heat transfer portion in the conventional boiler so that heat of the combustion gas can be sufficiently recovered in the convective heat transfer portion. For example, a temperature of the combustion gas obtained by lighting a fire in the burner 111 at the top of the boiler is lowered to approximately 1200° C. at the bottom of the boiler by radiant heat transfer in the combustion chamber 110, and it is further lowered to approximately 300° C. when passing through the convective heat transfer portion between the inner water pipe group 104 and the outer water pipe group 103, thereafter being exhausted.

In the configuration of the prior art combustion chamber, however, a temperature of the combustion gas becomes maximum in the vicinity of a fire hole of the burner 111, which may cause such a problem as that the heat load of the combustion chamber can not be increased. That is, in case of a once-through boiler, water is heated when passing through the water pipes upward to become vapor, a water/hot water area 112, a boiling area 113 and a vapor area 114 where water is dried out are thus formed upward in the mentioned order in the water pipes 103 and 104. The vapor area 114 is therefore disadvantageously positioned in the vicinity of the fire hole of the burner 111. Water or vapor, however, has a small coefficient of heat transfer. Thus, heat having a high temperature can not be accepted by water or vapor, and the water pipes may be excessively heated by the flame. Decrease in temperature of the combustion gas in the vicinity of the fire hole in the burner 111 is hence the only way to prevent the water pipes from being burnt, and heat load of the combustion chamber must be decreased and the necessary quantity of vapor must be assured by increasing the size of the boiler in the prior art.

DISCLOSURE OF THE INVENTION

It is therefore an object of the present invention to provide a small once-through boiler which can prevent water pipes from being burnt by excessive heating and prevent the water pipes from being burnt in the vicinity of a burner in particular, the small once-through boiler being capable of further increasing heat load of a combustion chamber to reduce the size thereof as compared with a prior art small once-through boiler.

To this end, the small once-through boiler according to the present invention is characterized in that: at least one regenerative burner system is provided in a combustion chamber, the regenerative burner system performing supply of combustion air and exhaust of combustion gas through a regenerator and supplying combustion air through the regenerator heated by heat of combustion gas by relatively changing flows of combustion gas and combustion air with respect to the regenerator; a water pipe group is provided apart from a wall surface of the combustion chamber to form a passage between a rear surface of the water pipe group and the wall surface of the combustion chamber; and communicating openings through which combustion gas passes are formed between adjacent water pipes at each of upper and lower ends of the water pipe group so that a part of combustion gas passes along the passage on the rear side of the water group, whereby the part of the combustion gas flows from the lower communicating openings into the passage upward and again flows from the upper communicating openings into the combustion chamber.

The inner surface of the water pipes facing the combustion chamber is therefore heated by radiant heat of the combustion gas injected into the combustion chamber. A part of the combustion gas is then turned around to ascend at the bottom of the furnace and directly exhausted through the regenerator of the regenerative burner system. Also, the remaining combustion gas flows from the communicating openings provided at the bottom of the combustion chamber into the passage at the rear side of the water pipes and again flows from the upper communicating openings into the combustion chamber. A part of the combustion gas is accompanied with the combustion air to be recycled, and the remaining part of the same is exhausted through the regenerator of the regenerative burner system. This ensures the boiler water flowing in the water pipes facing the combustion chamber to be heated by the radiant heat transfer from the flame and the combustion gas on the inner heat transfer surface facing the combustion chamber and heated by mainly the convective heat transfer of the combustion gas flowing in the passage on the outer heat transfer surface facing the passage. Therefore, even though the size of the combustion chamber is unchanged as in the prior art, the boiler can be reduced in size and price when obtaining the same quantity of vapor and a quantity of vapor can be further increased in the boiler according to the present invention when the heat transfer area is unchanged, as compared with the prior art.

Further, a part of the combustion gas again flowing from the upper communicating openings into the combustion chamber through the passage between the water pipe group and the furnace wall of the combustion chamber is accompanied with the combustion air injected into the combustion chamber to increase a capacity of the combustion gas. Increase in capacity of the combustion gas prevents the flame from rising and ensures that the combustion gas reaches the bottom of the combustion chamber to enable heating at the bottom of the combustion chamber by radiant heat transfer even though the combustion chamber has a large depth. At this time, recycle of the combustion gas also achieves reduction in Nox. Further, increase in quantity of the combustion gas circulating between the combustion chamber and the passage at the rear of the water pipes decreases a difference in temperatures between an inlet side and an outlet side of the passages provided at the rear of the water pipes, which can increase the quantity of heat transferred to the water pipes and reduce the heat transfer surface area when obtaining the same quantity of vapor. Moreover, the flame and the combustion gas around the fire hole of the burner are diluted with gas, which has been used for radiant heat transfer and the convective heat transfer to reduce its temperature, to lower the temperature, and hence the temperature of the combustion gas in the combustion chamber is evenly increased without generating an area locally having a high temperature. Increase in the heat load quantity in the combustion chamber therefore ensures reduction in size of the boiler.

Additionally, according to the prevent invention, sensible heat produced when the high-temperature combustion exhaust gas passes through the regenerator to be exhausted is recovered to the regenerator by direct heat exchange. Heat recovered to the regenerator is used to preheat the combustion air by direct heat exchange with extremely-high efficiency and is returned to the combustion chamber. The temperature of the combustion air is heightened to be close to that of the combustion gas flowing to the regenerator, and hence use of the high-temperature combustion air can maintain combustion with less fuel and rapidly increase the temperature in the combustion chamber. Also, the combustion exhaust gas is exhausted at a lower temperature (approximately 200° C. or below) than that obtained in the conventional boiler. According to the small once-through boiler of the present invention, heat balance is therefore excellent and a necessary quantity of vapor can be generated with less fuel, thus greatly reducing the running cost as compared with the prior art.

Here, according to the small once-through boiler of the present invention, it is preferable to use a regenerative burner system by which fuel is continuously injected from the same fuel nozzle without interruption and flows of the combustion exhaust gas and the combustion air are relatively changed with respect to the regenerator. In this case, combustion can not be interrupted because regenerative combustion is achieved by only changing flows of the combustion exhaust gas and the combustion air without interruption. Pressure fluctuation or irregularity of temperature distribution in the combustion chamber can be thus reduced. Although the combustion air and the fuel which are separately injected into the combustion chamber directly are mixed together after being injected into the combustion chamber, the combustion air has an extremely-high temperature (approximately 1000° C. or more), thereby producing stable combustion.

Furthermore, it is preferable that the regenerative burner system comprises a regenerator which is uniformly partitioned into three or more chambers in the circumferential direction in such a manner that fluid can pass through each chamber along the axial direction, a fuel nozzle which pierces the center of the regenerator and directly injects the fuel in the combustion chambers, an outlet/inlet means having an air supply chamber connected with a combustion air supply system and an exhaust chamber connected with a combustion gas exhaust system, and a changing means which is provided between the outlet/inlet means and the regenerator to separate the regenerator from the outlet/inlet means and continuously or intermittently rotates to ensure the exhaust chamber and the air supply chamber of the outlet/inlet means to sequentially communicate with any compartment of the regenerator divided into three or more chambers without allowing overlap, the fuel being continuously injected into the combustion chamber and the high-temperature combustion air being directly injected around the fuel from the regenerator into the combustion chamber with an injection portion being moved in the circumferential direction.

In such a case, the air supply chamber and the exhaust chamber of the outlet/inlet means are intermittently or continuously communicated with different chambers/ compartments of the regenerator through the changing means which continuously rotates so that the combustion air and the combustion exhaust gas simultaneously flows in the regenerator without being mixed together. The combustion air and the combustion exhaust gas therefore flow in the same chamber/compartment at different points in time, for example, the combustion air flows in the regenerator after the combustion exhaust gas has left the regenerator, the combustion air is preheated to a high temperature close to that of the combustion exhaust gas to be supplied by using heat of the regenerator which was heated when the combustion exhaust gas passed therethrough. When heat of the regenerator is lowered, rotation of the changing means moves the position at which the combustion air is injected in the circumferential direction and the regenerator of the combustion air supply means that has exhausted the combustion gas is used to supply the combustion air. Thus, the flame formed by the combustion air supplied while rotatably changing its position around the fuel nozzle and the fuel injected in the center rotates in the combustion chamber in the circumferential direction to uniformly heat the combustion chamber. In addition, frequent changes in position of the flame can obtain the uniform temperature distribution in the combustion chamber, thus reducing irregularity of heating.

According to the small once-through boiler of the present invention, it is preferable to use the regenerative burner system which alternately burns a pair of burners, each of which has a regenerator, in a short time so that exhaust is made through the regenerator of a burner which is not making combustion. In such a case, frequent changes in position of the flame further uniforms the temperature distribution in the combustion chamber, reducing irregularity of heating. This reduces fluctuation of heat load of the furnace and makes the state of boiler water in the water pipes uniform, which suppresses local generation of only vapor that may damage the water pipes.

DESCRIPTION OF THE PREFERRED EMBODIMENT

Figure 1:
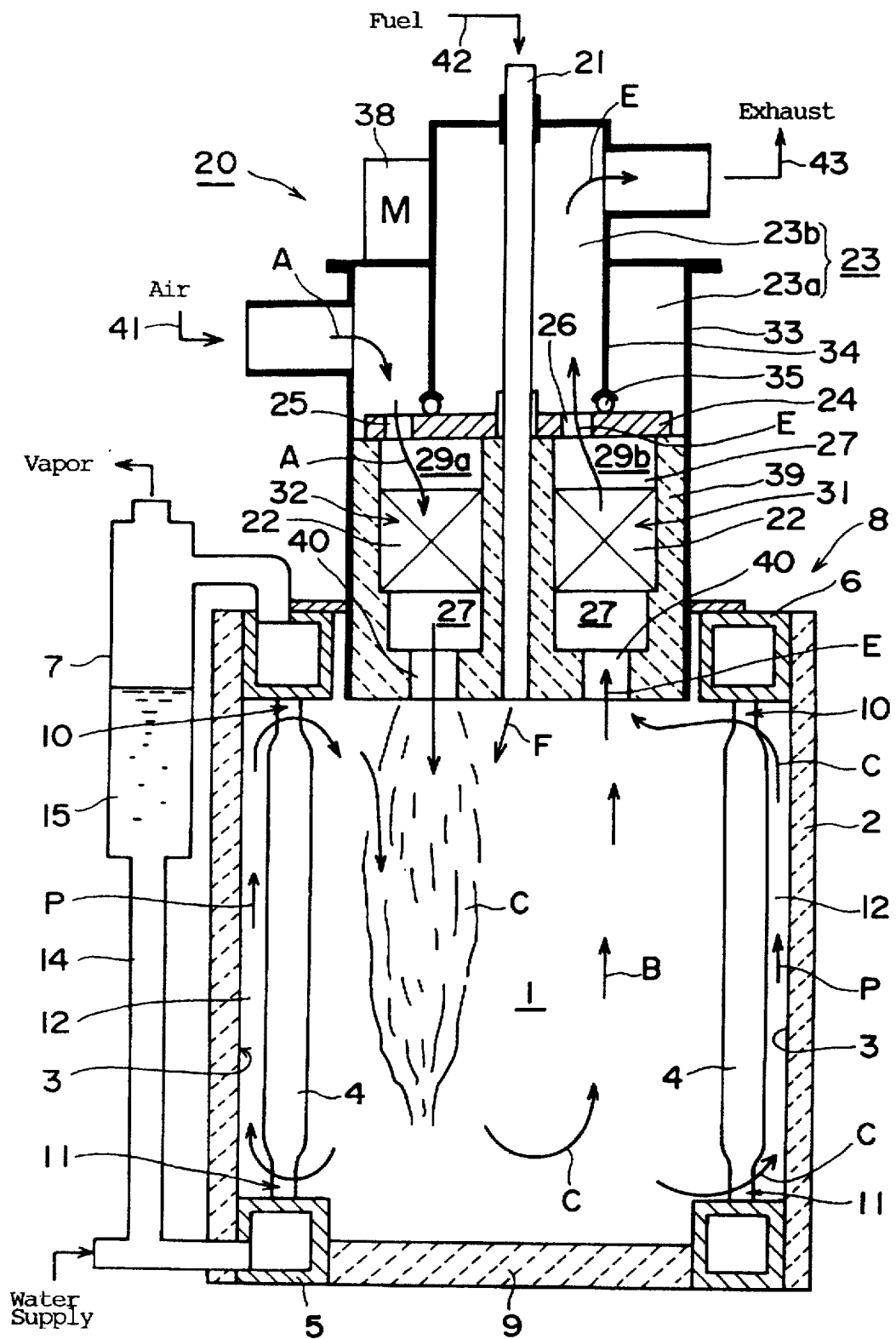
FIG. 1 is a vertical cross-sectional view showing an embodiment of a small once-through boiler according to the present invention, taken along the central line of the boiler.

The configuration of the present invention will now be described in detail based on a preferred embodiment illustrated in the accompanying drawings.

FIGS. 1 to 5 show an embodiment of a small once-through boiler according to the present invention. The small once-through boiler has a group of water pipes 4 annularly provided inside an elongated cylindrical furnace body 2 forming, for example, a combustion chamber 1 separately from an inner peripheral wall surface 3 of the furnace body 2. The annularly-provided group of water pipes 4 forms the combustion chamber 1 inside thereof. The group of water pipes 4 are connected with each other by means of a lower header 5 and an upper header 6. Also, the upper header 6 and the lower header 5 are connected with each other through a vapor-liquid separator 7. Boiler water 15 supplied from the lower header 5 is heated when moving upward inside the water pipes 4 and boiled to be turned into vapor. It is then collected in the upper header 6 and moved to the vapor-liquid separator 7 where only vapor is taken out and warm water is again supplied through a reflux pipe 14 as the boiler water 15. A cylindrical passage 12 is formed between the inner peripheral wall surface 3 of the furnace body 2 and the annular pipe wall constituted by a plurality of water pipes 4. Upper communicating openings 10 and lower communicating openings 11 are provided in the vicinity of the upper and lower ends of the water pipes 4, i.e., a furnace top portion 8 and a furnace bottom portion 9 to ensure incoming and outgoing of the combustion gas by achieving communication of the passage 12 with the combustion chamber 1 provided inside of the group of water pipes 4. As shown in, e.g., FIG. 3, the upper and lower communicating openings 10 and 11 can be obtained by narrowing each aperture of the water pipes 4 at the upper and lower ends thereof to form a gap between two adjacent water pipes. The group of water pipes 4 are closely arranged with no gap therebetween except for the both end portions thereof, and a passage 12 which communicates with the combustion chamber 1 through the upper and lower communicating openings 10 and 11 between the water pipes and the combustion chamber wall surface 3 is formed to provide a pipe wall surrounding the combustion chamber 1. Further, the communicating openings 10 and 11 may be formed by fixing fins 13 to portions other than upper and lower ends of the water pipes 4 and connecting fins 13 of adjacent water pipes 4 with each other by welding or riveting. In either case, the water pipes 4 are connected with each other at portions other than the upper and lower communicating openings 10 and 11 by means of the headers 5 and 6 at both ends so as not to produce a gap therebetween, but this structure does not aim to completely eliminates the gap and there is no problem if a small gap is generated to cause leakage.

The furnace body 2 is usually formed by lining the inside of the steel casing with a fire resisting insulation or providing an air-cooled layer for flowing cooling air therethrough inside the casing. Further, the water pipes 4 may be so arranged as to form a duplex tube depending on the situation. In such a case, fins 13 annularly provided on the outer side may be welded to reach the upper and lower headers 5 and 6 with no clearance so that the combustion gas can circulate between the two tubes without leaking outside, and the water pipe group forming the outer annular tube may function as a furnace wall, which eliminates necessity of the fire resisting insulation material. A regenerative burner system 20 is provided to the furnace top portion 8 of this furnace body 2 as a heat source. Although one regenerative burner system 20 is provided to the combustion chamber 1 in this embodiment, two or more burner systems may be provided depending on the situation.

The description will be given as to the embodiment where the regenerative burner system constitutes one burner. In this regenerative burner system 20, a fuel nozzle 21 for injecting fuel F directly into the combustion chamber 1 pierces the center of the regenerator 22 so that high-temperature combustion air A is injected from the circumference of the jet of the fuel F in substantially parallel with the fuel jet.

Here, the system which aims to supply the combustion air A and emit the exhaust gas E is basically constituted by: the regenerator 22 that is uniformly partitioned into three or more chambers, e.g., three chambers designated by reference numerals 30, 31 and 32 in the circumferential direction in this embodiment to ensure the fluid to pass therethrough in the axial direction: an outlet/inlet portion 23 having an air supply chamber 23a connected with an air supply system 41 and an exhaust chamber 23b connected with an exhaust system 43; and a changing means 24 which is provided between the outlet/inlet means 23 and the regenerator 22 to separate the regenerator 22 from the outlet/inlet means 23, has an air supply communicating hole 25 and an exhaust communicating hole 26 that do not simultaneously exist in the same compartment and continuously or intermittently rotates to achieve sequential communication of the exhaust chamber 23b and the air supply chamber 23a of the outlet/inlet means 23 with any of the chambers 30, 31 and 32 of the regenerator 22.

Although the regenerator 22 is not restricted to a certain shape or material, it is preferable to use a honey-comb-shaped regenerator produced by extrusion-molding ceramics such as cordierite or mullite for heat exchange between the exhaust gas having a temperature of approximately 100° C. and the combustion air having a temperature of approximately 20° C. For the regenerators 22, there are preferably used cylindrical regenerators, which have a plurality of honey-comb-shaped cell holes, molded with material having a relatively-lower pressure loss but a large calorific capacity and high durability such as ceramics. In this case, burning sulfur components or its chemically-changed substance is captured in ceramics even though the temperature of the exhaust gas E is lowered below a sulfuric acid dew point when recovering heat from the exhaust gas E, which can prevent ducts of the exhaust system provided at the downstream side from corroding at a low temperature. Of course, the regenerators are not restricted to this type, and any other type of regenerator such as a ceramic ball or a nugget may be used. The honey-comb-shaped regenerator 22 may be manufactured using material other than ceramics, e.g., metal such as heat resisting steel depending on the situation. In addition, it is preferable to use metal such as aluminum, iron or copper that is relatively cheaper than ceramics for the intermediate or high temperature of approximately 500° to 600° C. It is to be noted that the honey-comb shape essentially means hexagon cells (holes) but a plurality of square or triangular cells, as well as hexagon cells, are also included in this specification. In addition, the honey-comb-shaped regenerator 22 may be obtained by not only integral molding as described above but also bundling tubes. In this embodiment, the regenerator 22 is divided into three chambers in the circumferential direction by distribution chambers 27 provided in front of and at the rear of the regenerator 22. For example, the inside of the regenerator 22 is partitioned into three chambers, i.e., a vacant chamber 30 in which no fluid flows, a chamber 31 in which the exhaust gas E flows and a chamber 32 in which the air A flows by the distribution chambers 27 each of which is divided into three chambers 29a, 29b and 29c by means of partitions 28 in this embodiment. That is, the regenerator 22 itself has a honey-comb shape consisting of a set of cells constituting independent passages, and a set of cells within a range partitioned by the partitions 28 of the distribution chamber 27 thus forms one partitioned chamber. Provision of the distribution chamber 27 can disperse the fluid which flows in or out through the communicating holes 25 and 26 to be uniformly split over the entire regenerator 22. Furthermore, the shape of the regenerator 22 is not restricted to the illustrated honey-comb shape, and flat-plate type or corrugated-plate type regenerative material may be radially provided inside the cylindrical casing or pipe-type regenerative material may be filled in the cylindrical casing so as to pass the fluid in the axial direction, although not shown. Moreover, the single regenerator 22 is substantially divided into three chambers 30, 31 and 32 by the distribution chamber 27 in this embodiment, but the present invention is not limited to this structure and the regenerator 22 itself may be previously partitioned into three chambers. For instance, although not shown, a cylindrical casing which is divided into three chambers in the circumferential direction by partition walls so as to enable the fluid to pass therethrough in the axial direction may be prepared, and a lump of spherical-type, short-pipe-type, short-rod-type, strip-type, nugget-type or net-type regenerative material can be filled in each of these chambers. If regenerative material such as $Si_3N_4$ that can be used at a higher temperature than that suitable for cordierite or mullite is used for the regenerator 22, it is hard to mold the regenerator 22 into the complicated honey-comb shape, but it can be readily molded into a simple pipe-like a rod-like or a ball-like shape.

Assuming that a chamber 32 in which the air A flows (referred to as an air supply chamber hereinbelow) and a chamber 31 in which the exhaust gas E flows (referred to as an exhaust chamber hereinbelow) form a pair, the combination of this pair and at least one vacant chamber 30 (chamber in which no fluid flows) corresponds to a number of chambers partitioned in the regenerator 22, and three is determined to a minimum number. Further, formation of the chamber 30 in which no fluid flows between the air supply chamber 32 and the exhaust chamber 31 can constitute the above-mentioned system. In this case, a minimum number of chambers is four.

In this embodiment, the outlet/inlet means 23 is partitioned into an air supply chamber 23a connected with the air supply system 41 and an exhaust chamber 23b connected with the exhaust system 43 by providing the cylindrical partition wall 34 in the rectangular casing 33. The air supply chamber 23a is formed outside the partition wall 34 and the exhaust chamber 23b is formed inside the same in this embodiment. The changing means 24 is so disposed as to independently rotate between the outlet/inlet means 23 and the distribution chamber 27 in this embodiment. Between the partition wall 34 and the changing means 24 is provided a sealing member 35 so as to allow rotation of the changing means 24 and to prevent the fluid from leaking. It is to be noted that the changing means 24 is rotatably supported by, e.g., the partition wall 34 of the outlet/inlet means 23 and the central fuel nozzle 21 and has a gear 36 formed on the peripheral edge thereof so that the gear 36 engages with a drive gear 37 positioned at a corner of the casing 33 to be rotated and driven by a motor 38. It is needless to say that the present invention is not limited to this structure, and rotation and driving may be enabled by a friction wheel, a chain or a belt pressure-welded on the peripheral edge of the changing means 24.

The changing means 24 that achieves communication of the air supply chamber 23a and the exhaust chamber 23b of the outlet/inlet means 23 only with the corresponding chambers/compartments 32 and 31 of the regenerator 22 is a disc orthogonal to the passage, and is provided with at least one air supply communicating hole 25 that ensures any one compartment of the regenerator 22 to communicate with the air supply chamber 23a and at least one exhaust communicating hole 26 that ensures any one compartment to communicate with the exhaust chamber 23b. The exhaust communicating hole 26 and the air supply communicating hole 25 are formed to satisfy the following three conditions: (1) The air supply communicating hole 25 and the exhaust communicating hole 26 do not simultaneously exist in the same chamber/compartment, (2) starting from the foremost communicating hole positioned in a chamber/compartment, following the vacant chamber 30, the communicating holes sequentially change its position to the subsequent chamber/compartment one by one; and (3) the size of the air supply communicatinig hole 25 and the exhaust communicating hole 26 is such that these holes can be simultaneously accommodated in one chamber when they are arranged so as not to overlap one on another. Here, although the air supply communicating hole 25 and the exhaust communicating hole 26 are set to be holes having substantially the same size and shape, the present invention is not restricted to this configuration, and the air supply communicating hole 25 and the exhaust communicating hole 26 may have different dimensions or shapes, or the size or shape may differ depending on each communicating hole if necessary. In general, these holes may be so set as to substantially balance a quantity of air and a quantity of exhaust gas, but one communicating hole may be set larger than the other hole depending on the situation.

The fuel nozzle 21 is disposed so that it is directly exposed or protrudes toward the combustion chamber 1 through the regenerator 22. The regenerator 22 is enclosed by a casing 39 made of heat resisting material and accommodated in a metal casing 33. Also, the fuel nozzle 21 is held in a heat resistant casing 39. Here, to the heat resistant, casing 39 are formed three injection openings 40, that communicate with the respective chambers 29a, 29b and 29c of the distribution chamber 27, in the axial direction.

According to the boiler having the above arrangement, the entire peripheral surface of the water pipes functions as a heat transfer surface in the following manner to realize uniform heating without irregularity.

The air A and the fuel F supplied into the combustion chamber 1 through the air supply system 41 and the fuel supply system 42 are mixed together to be burnt. The combustion air A is preheated to have a high temperature by passing through the regenerator 22 of the regenerative burner system 20 heated by start-up combustion and thereafter supplied into the combustion chamber 1. Further, the fuel F is directly injected from the fuel nozzle 21 into the combustion chamber 1.

Here, the high-temperature air A and the fuel F injected from the fuel nozzle 21 are separately injected into the combustion chamber 1, spread in the combustion chamber 1 and mixed together apart from the fuel nozzle 21. At this time, the air A and the fuel F widely spread in the mixing area to make mixture difficult, which is essentially a condition unsuitable for combustion. The air A itself has, however, a high temperature of 700° to 800° C. or above, and hence combustion is readily enabled under such a condition. That is, the air A preheated to have a high temperature of 700° to 800° C. or above is injected into the combustion chamber 1 and, at the same time, involves the combustion exhaust gas. The concentration of oxygen is therefore lower than that of the usual air immediately before combustion. However, combustion starts the moment oxygen contacts with the fuel and is stably maintained even though the concentration of oxygen is extremely lower than that of the usual combustion air because of the combustion air preheated to have a high temperature above a sell ignition temperature of the fuel or a combustion stabilizing temperature of the mixture. Further, if the concentration of oxygen immediately before combustion is greatly lower than usual as a result of involvement of furnace exhaust gas, an oxidative exothermic reaction rate becomes lower, thereby obtaining the flame forming a flat temperature distribution having a large volume with no peak. It is to be noted that the combustion stabilizing temperature of the mixture in a given concentration of oxygen may differ depending on its concentration of oxygen or a type of fuel but it is usually lower than a temperature of the above-described combustion air (700° to 800° C.) in the regularly-used fuel. The high-temperature preheated air supplied through the regenerator 22 therefore has a temperature equal to or above the combustion stabilizing limit temperature. The inner surface of the water pipes 4 facing the combustion chamber 1 is heated by radiant heat of the combustion gas C generated from this combustion. A part of the combustion gas C thereafter flows from the lower communicating openings 11 at the furnace bottom portion 9 into the passage 12 at the rear of the water pipes 4 to rise (indicated by an arrow P), and heats the rear surface of the water pipes 4 by convective heat transfer before returning from the upper communicating openings 10 to the combustion chamber 1. Furthermore, the remaining combustion gas C turns around at the furnace bottom portion 9 to move upward (arrow B) in the combustion chamber 1 and is exhausted outside the furnace from the injection opening 40 of the chamber 31 of the regenerator connected with the exhaust system 43.

Moreover, a part of the combustion gas which has flown into the passage 12 through the lower communicating openings 11 against flows from the upper communicating openings 10 into the combustion chamber 1 through the passage 12, a part thereof being accompanied with the air A injected from the injection opening 40 to be recycled while the remaining part of the same being mixed with the combustion gas that has turned around and moved upward in the combustion chamber 1 to be exhausted through the regenerator 22. Here, the combustion gas C again flowing from the upper communicating openings 10 into the combustion chamber 1 through the passage 12 has a temperature lowered by convective heat transfer when passing through the passage 12 at the rear of water pipes 4. For example, the combustion gas, whose temperature has been decreased to approximately 1000° C. at the combustion chamber bottom portion, again lowers its temperature when passing through the passage 12, the temperature further dropping to approximately 200° C. when the combustion gas again flows from the upper communicating openings 10 into the combustion chamber 1. The combustion gas in the vicinity of the fire hole of the burner is diluted with the low-temperature combustion gas to decrease the temperature thereof, thereby entirely lowering the combustion gas temperature without generating an area locally having a high temperature. Additionally, a part of the combustion gas again flowing into the combustion chamber 1 is accompanied with the combustion gas C injected from the burner system 20 to increase a capacity of the combustion gas C, and rising of the flame can be avoided while leading the combustion gas C to the bottom of the combustion chamber 1 even though the combustion chamber 1 has a large depth, thus uniformly heating the combustion chamber 1 in the vertical direction. At this time, reduction in Nox is also achieved by recycle of the combustion gas C. Moreover, increase in a quantity of the combustion gas circulated in the combustion chamber leads to increase in a quantity of the combustion gas C flowing through the passage 12 at the rear of the water pipes 4, and a difference in temperature between gas around the lower communicating openings 11 and that around the upper communicating openings 10 hence becomes small to increase a quantity of heat transferred to the water pipes 4 and the boiler water 15, reducing the heat transfer surface area. On the other hand, a part of the combustion gas C which has been circulated toward the top of the combustion chamber 1 through the passage 12 between the water pipes 4 and the combustion chamber wall surface 3 and has a temperature of approximately 200° C. is mixed with a part of a large quantity of combustion gas C having a temperature of approximately 1000° C. which has been turned upward at the bottom of the combustion chamber 1 and circulated in the furnace, the mixture being exhausted as the exhaust gas having a temperature of approximately 900° C. As shown in the drawing, the mixture is exhausted from the injection opening 40 communicating with the regenerator compartment 31 connected with the combustion gas exhaust system 43.

Here, the combustion air and combustion gas to flow in the regenerator 32 are changed over at intervals of, for example, 10 to 90 seconds, and more preferably, 10 to 20 seconds, or they are changed over when a temperature of the exhaust gas E exhausted through the regenerator 22 has reached a predetermined value, for example, about 200° C.

Figure 2:
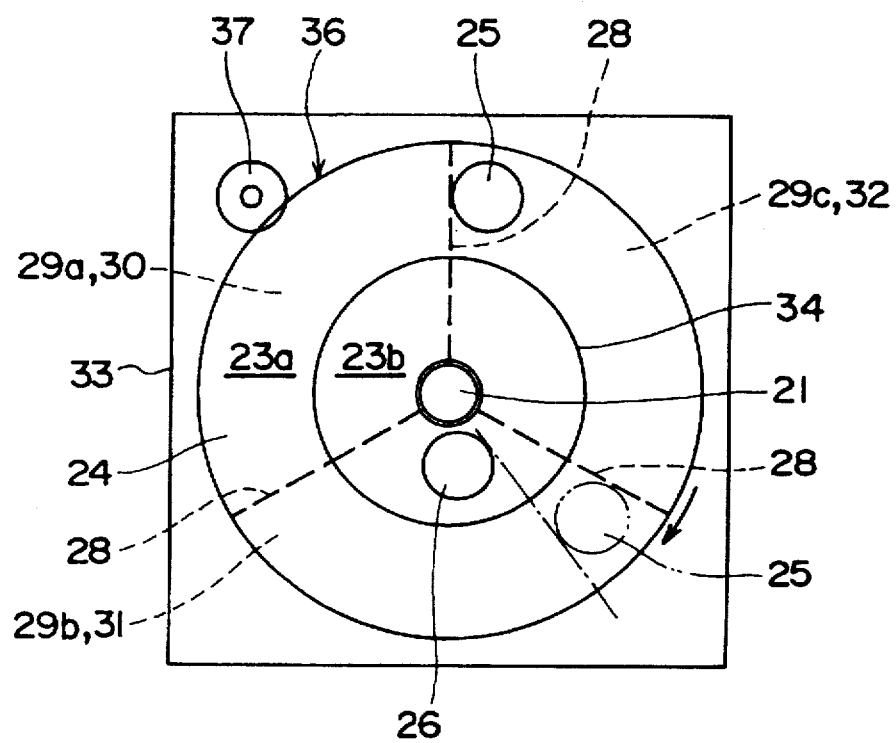
FIG. 2 is a principle view showing a changing means of a regenerative burner system used in the small once-through boiler illustrated in FIG. 1.
Figure 3:
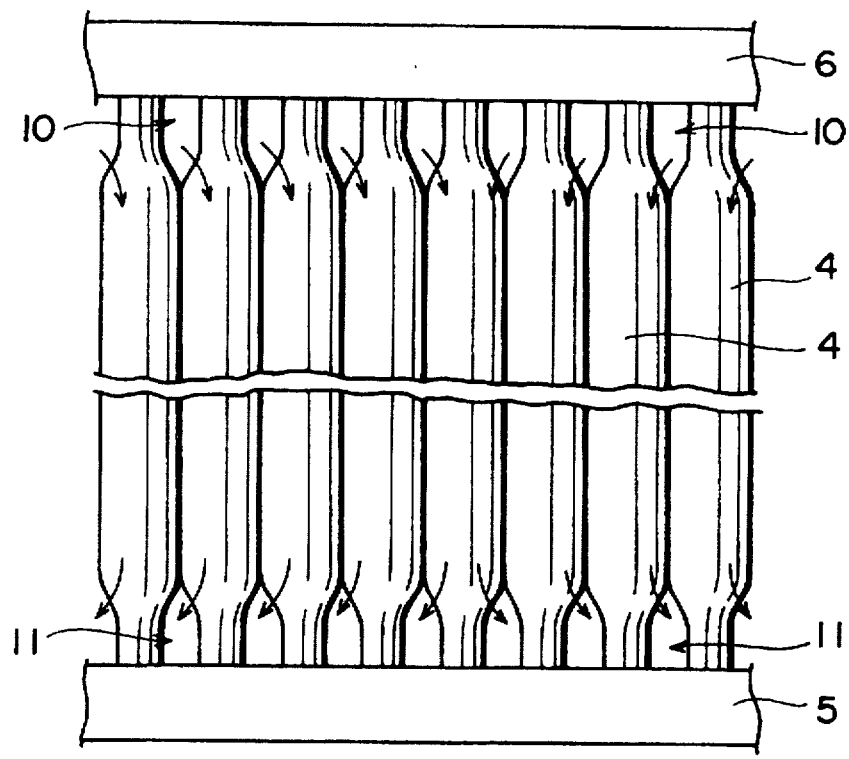
FIG. 3 is a development showing an embodiment of water pipes of the small once-through boiler according to the present invention.
Figure 4:
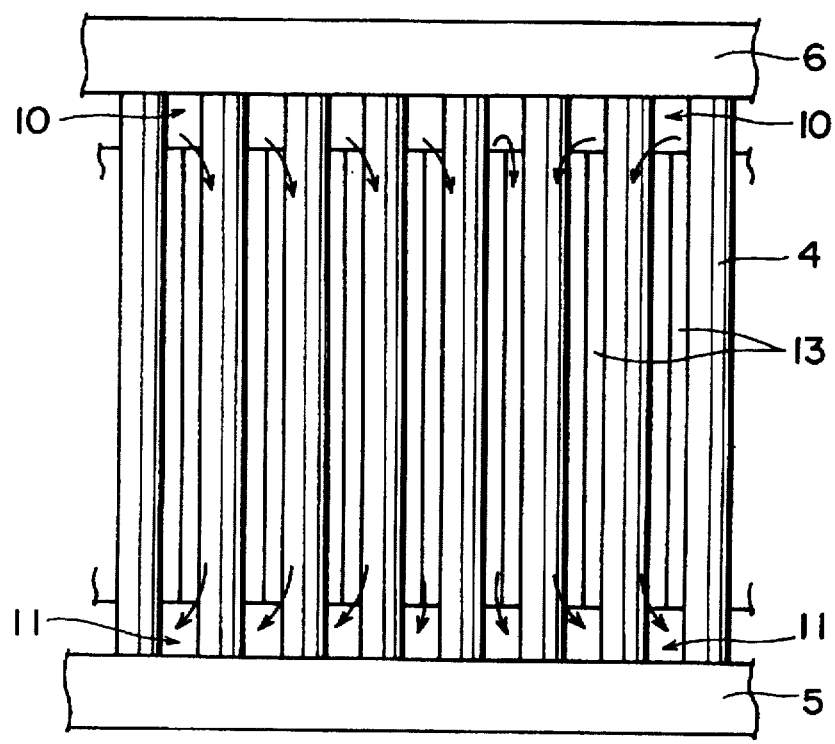
FIG. 4 is a development showing another embodiment of the water pipes.

When the air A is led into the air supply chamber 23a of the outlet/inlet means 23 in the state shown in FIG. 2, the air A flows into the second chamber 29c of the distribution chamber 27 through the air supply communicating hole 25 and then flows into the corresponding chamber/compartment 32 of the regenerator 22. At this stage, since the corresponding compartment/chamber 32 of regenerator 22 is heated by heat of the high-temperature exhaust gas E that has passed therethrough before the changing operation, the air A passing through the compartment/chamber 32 takes heat of the regenerator 22 to have a high temperature, i.e., a high temperature close to that of the exhaust gas that has heated the regenerator 22 and is directly injected from the circumference of the fuel nozzle 21 provided in the center of the regenerator 22 into the combustion chamber 1 in substantially parallel with the fuel F (the state shown in FIG. 5(A)). Meanwhile, the exhaust gas E within the combustion chamber 1 is led by the function of an induced draft fan of the exhaust system 43 into the corresponding compartment 31 of the regenerator 22 communicating with the exhaust chamber 23b of the outlet/inlet, means 23 through the exhaust communicating hole 26. The exhaust gas E whose temperature has been lowered by heating the corresponding compartment 31 of the regenerator 22 flows into the first chamber 29b of the distribution chamber 27 and is then exhausted to the exhaust chamber 23b through the exhaust communicating hole 26.

Figure 5A:
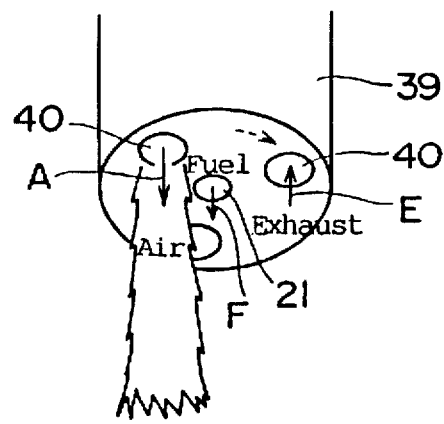
FIGS. 5(A), 5(B) and 5(C) are explanatory views of operations where the flame rotates in the circumferential direction in the regenerative burner system used in the embodiment illustrated in FIG. 1.
Figure 5B:
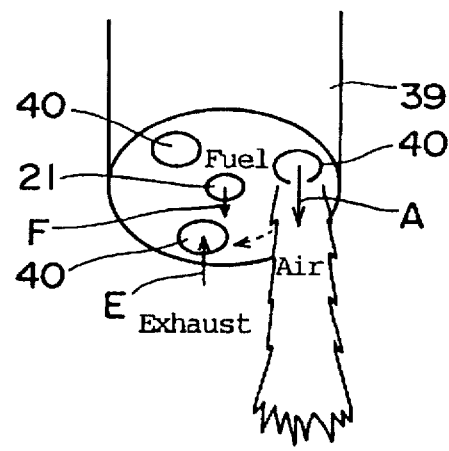
Figure 5C:
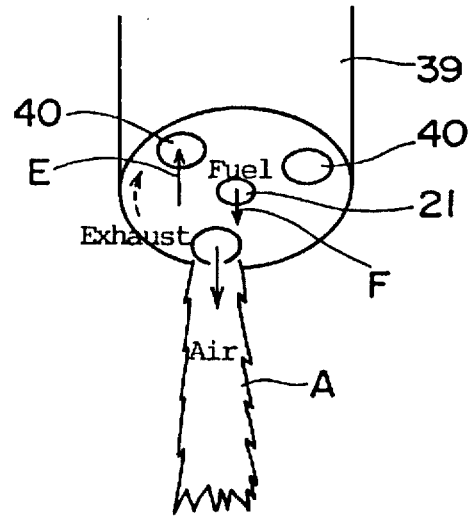
Figure 6:
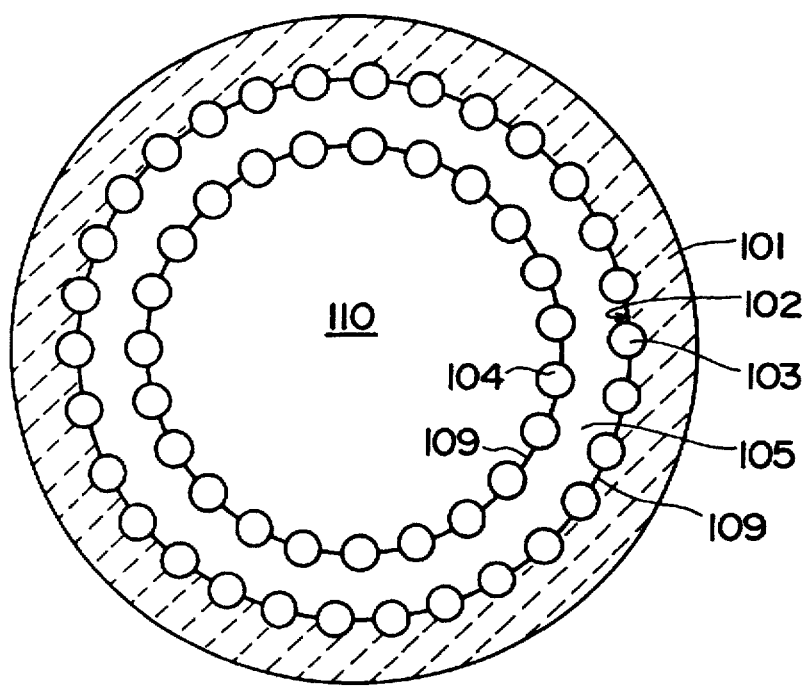
FIG. 6 is a horizontal cross-sectional view showing a combustion chamber of a prior art boiler.
Figure 7:
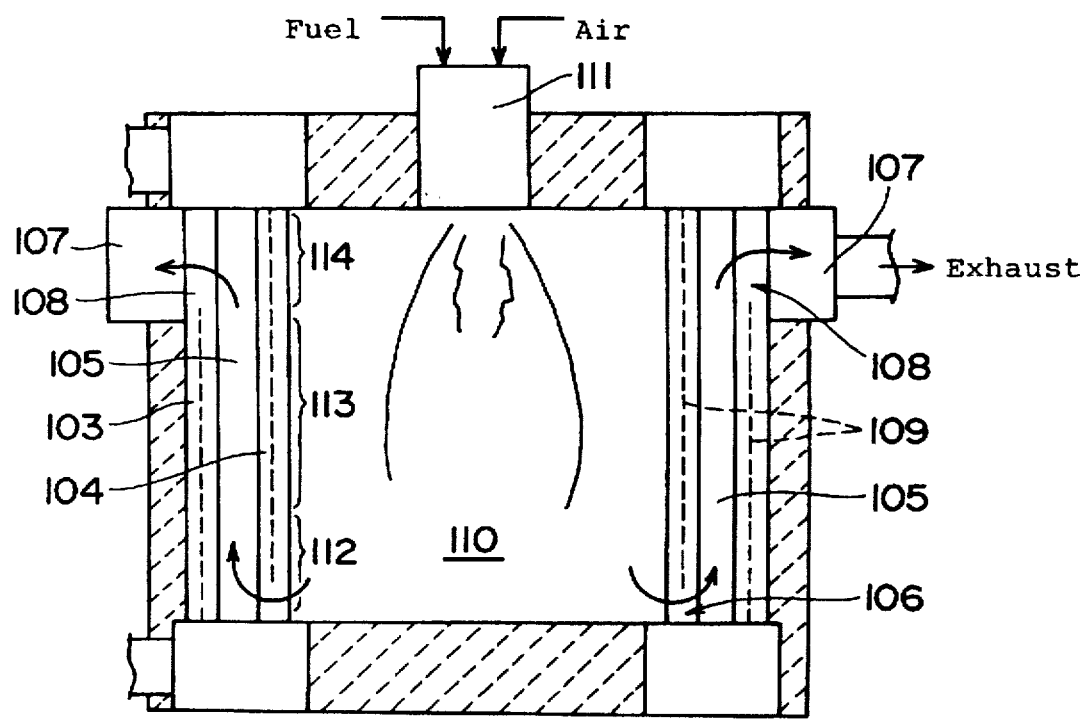
FIG. 7 is a vertical cross-sectional view showing the case where the regenerative burner system is applied to the combustion chamber of the prior art boiler.

Subsequently, continuous or intermittent clockwise rotation of the changing means 24 from the state shown in FIG. 2 involves the exhaust communicating hole 26 to reach the third chamber 29a of the distribution chamber provided on the left side thereof, ensuring that the first chamber 29b and the third chamber 29a simultaneously communicate with the exhaust chamber 23b. The exhaust gas E within the combustion chamber 1 flows in the first chamber 29b and the third chamber 29a of the distribution chamber 27 after passing through the two compartments 31 and 30 of the regenerator 22 and further flows into the exhaust chamber 23b connected with these chambers 29a and 29b through the exhaust communicating hole 26. The exhaust gas E is then exhausted. After the exhaust communicating hole 26 has completely changed its position to the third chamber 29a (the vacant portion designated by reference numeral 30 in FIG. 2), the air supply communicating hole 25 positioned in the second chamber 29c changes its position to the first chamber 29b (the chamber represented by reference numeral 31 in FIG. 2), and the area partitioned by the second chamber 29c (the chamber denoted by reference numeral 32 in FIG. 2) becomes vacant. In other words, the exhaust gas E flows into the vacant chamber 30 in which no fluid has flown, the air A flows into the chamber 31 in which the exhaust gas E has flown, and no fluid flows into the chamber 32 in which the air A has flown. The regenerator 22 is therefore heated by heat of the exhaust gas E, and the air A passing through the heated regenerator 22 is heated by heat of the regenerator 22. Here, a flow of the fluid is changed by utilizing the vacant chamber 30 while ensuring communication of the respective chambers 30 and 32 even though the air supply communicating hole 25 extends over both the vacant chamber 30 and the precedent chamber 32, and a flow of the fluid is not thus interrupted. The exhaust gas E is sequentially switched to the air A or vice versa without interrupting a flow. The combustion air A therefore passes through the heated regenerator 22 to become hot air having a high temperature close to that of the exhaust gas and is supplied to the combustion chamber 1 (the state shown in FIG. 5(B)). Continuous or intermittent rotation of the changing means 24 sequentially changes the position at which the air A is injected in the circumferential direction as shown in FIGS. 5(A) to 5(C), and the flame rotates in the circumferential direction within the combustion chamber 1.

Although the above has described a preferred embodiment according to the present invention, the invention is not restricted to this embodiment and various modifications are possible within the true scope of the invention. The air supply system 41 and the exhaust system 43 are alternately changed over by the changing means 24 and connected with the fixed regenerator 22 in this embodiment, but the regenerator itself may be rotated between the exhaust system and the air supply system so as to relatively change flows of the exhaust gas and the air with respect to the regenerator.

Further, a flow of the fuel may be also changed besides the combustion air to alternately burn a pair of burners so that the combustion gas is exhausted through the regenerator of the burner that is being stopped. Although not shown, it is possible to adopt such a structure as that two systems in each of which the regenerator is included in the burner body and the regenerator is integrated with the burner are prepared, and a pair of the burners alternately perform combustion to exhaust the combustion gas through one system of the burner and regenerator which is not performing the combustion, for example. The air supply system and the exhaust system are connected to the regenerator/burner throat of the two burners through, e.g., a four-way valve so that each system is selectively connected to either the air supply system or the exhaust system. The air is supplied to one burner through the regenerator, while the combustion gas is exhausted from the other burner through the regenerator thereof. Also, the fuel is alternately supplied to a pair of the burners by using, for example, a three-way valve.

Moreover, since a quantity of the generated combustion gas is larger than that of the combustion air supplied to the combustion chamber 1 via the regenerator 22, it is preferable to directly exhaust the combustion exhaust gas whose quantity corresponds to that increased quantity without using the regenerator 22. In this case, the temperature of the exhaust gas emitted via the regenerator 22 can be set to the minimum level, thereby enhancing the thermal efficiency of the entire boiler.

What is claimed is:

1. A once-through boiler comprising: a boiler body having a peripheral wall with an inside wall surface; means defining a combustion chamber containing a combustion area in the boiler body; a combustion air supply system; a flue gas exhaust system; a fuel supply system; a plurality of water tubes arranged along the inside wall surface and spaced from the inside wall surface, the water tubes being laterally connected to each other so as to define the combustion chamber enclosed by a substantially continuous tube wall formed by the water tubes, the tube wall also defining a fluid passage between said water tubes and said inside wall surface; a lower opening between lower end portions of adjacent water tubes in the tube wall so that a part of combustion gas produced in said combustion area is introduced into said fluid passage through the lower opening; an upper opening provided between upper end portions of adjacent water tubes in the tube wall so that a gas flow through said fluid passage is allowed to flow out from the upper opening into said combustion chamber; and a regenerative burner system for burning fuel from the fuel supply system with air from the combustion air supply system to form combustion exhaust gas in the combustion area, the regenerative burner system being provided on an upper area of the boiler body, the burner system having a plurality of regenerator sections in communication with the combustion chamber, and in selective communication with the combustion air supply system and the flue gas exhaust system, the regenerator sections being adapted to feed a combustion air flow to the combustion chamber and to exhaust the combustion exhaust gas from the combustion chamber so that heat of the combustion exhaust gas is transferred to the combustion air; and so that said part of combustion gas heats said water tubes while moving upwardly through said fluid passage and recirculates into the combustion chamber.

2. A once-through boiler according to claim 1, wherein said regenerative burner system includes a fuel injection nozzle which continuously injects a fuel into the combustion chamber, and the regenerator sections through which the combustion air flow and the combustion exhaust gas flow are selectively introduced, said regenerator sections being positioned around the fuel injection nozzle.

3. A once-through boiler according to claim 1, wherein a lower end of each water tube is connected to a lower header and an upper end of each water tube is connected to an upper header, the lower and upper headers extending around said combustion chamber in an annular manner.

4. A once-through boiler according to claim 1, wherein an external diameter of each of said water tubes is reduced at the lower and upper end portions thereof, so as to form said lower and upper openings.

5. A once-through boiler according to claim 1, wherein each of said water tubes is provided with a side fin laterally extending from the water tube so as to connect said water tubes to each other except at their lower and upper end portions, whereby said lower and upper openings are formed in position between the end portions of the water tubes.

6. A once-through boiler according to claim 1, wherein said regenerative burner system includes fuel injection means for injecting a fuel into a center region of the combustion chamber; at least two communication chambers each having one of said regenerator sections and an inlet/outlet for injecting a combustion air flow into said combustion area and exhausting an exhaust gas flow therefrom; changeover means for allowing said communication chamber to be selectively in communication with the combustion air supply system or the flue gas exhaust system.

7. A once-through boiler according to claim 6, wherein said regenerative burner system includes at least three communication chambers disposed about a fuel nozzle of the fuel injection means, and said changeover means includes first and second communicating openings which are circumferentially displaceable, the first communicating opening being adapted to introduce a combustion air flow from the combustion air supply system into one of said communication chambers, the second communicating opening being adapted to introduce a combustion exhaust gas flow from the other of said communication chambers to the flue gas exhaust system, said changeover means step wisely displacing said communicating openings in a predetermined time interval so as to successively feed the combustion air flow to the combustion chamber through one of said communication chambers and successively exhaust the combustion exhaust gas flow therefrom through the other of said communication chambers, and said fuel nozzle continuously injecting the fuel parallel with the combustion air flow at the center region of the combustion chamber.

8. A once-through boiler according to claim 1, wherein said regenerator sections have a honeycomb structure with a plurality of cell holes defining fluid passages for the combustion air flow and the combustion exhaust gas flow.

9. A once-through boiler provided with a radiant heat transfer section for heating a plurality of vertical water tubes positioned in a peripheral zone of said radiant heat transfer section and arranged in a row of circular formation comprising: a regenerative combustion system positioned in an upper portion of a boiler body; the regenerative combustion system including a combustion air supply system, a flue gas exhaust system, a fuel supply system, a regenerator and changeover means for changing over a passage for a combustion air flow and a passage for a combustion exhaust gas flow, the regenerator having first and second portions adapted to be alternately in heat-transferable contact with the combustion air flow to be supplied to said radiant heat transfer section and the combustion exhaust gas flow extracted therefrom so that the combustion air is heated by the combustion exhaust gas; means for connecting the water tubes with each other so as to define the radiant heat transfer section inside of the circular row of the water tubes and a convection heat transfer section in which a combustion gas flow heats the water tube while moving upward therethrough; said convection heat transfer section is formed between the water tubes and a wall surface of the boiler body; means for introducing the combustion gas from the radiant heat transfer section into a lower portion of the convection heat transfer section; and means for recirculating the combustion gas from the convection heat transfer section to an upper area of said radiant heat transfer section so that an exhaust gas recirculation flow is generated in the radiant heat transfer section.

10. A once-through boiler according to claim 9, wherein said fuel supply system includes fuel injection means for injecting a fuel into a center region of the radiant heat transfer section, and said first and second portion of the regenerator is alternately in heat-transferable contact with either of the combustion air flow and the combustion exhaust gas flow.

11. A once-through boiler according to claim 10, wherein said convection heat transfer section is profiled in an annular form between said circular row of the water tubes and an inside wall surface of the boiler body, and said regenerator further includes a third portion adapted to be alternately in heat-transferable contact with either of the combustion air flow and the combustion exhaust gas flow; and wherein said changeover means allows one of said three portions of said regenerator to communicate with said combustion air supply system, and allows the other thereof to communicate with said fuel gas exhaust system, while the remaining portion of the regenerator is isolated from the combustion air and the combustion exhaust gas.

12. A once-through boiler according to claim 11, wherein said combustion air supply system includes an air supply chamber, said fuel gas exhaust system includes an exhaust chamber, and said changeover means comprising a rotatable disc interposed between said chambers and said regenerator which disc has first and second communicating openings; and wherein the first opening is normally in communication with the air supply chamber and selectively in communication with one of said portions of the regenerator, whereas the second opening is normally in communication with the exhaust chamber and selectively in communication with the other of said portions of the regenerator.

13. A once-through boiler according to claim 12, wherein said changeover means further comprises driving means for rotating said disc intermittently in a predetermined time interval.

14. A method of heating a plurality of water tubes in a combustion chamber of a once-through type boiler which includes a regenerative combustion system having a regenerator, which comprises: introducing a combustion air flow through a first part of the regenerator into said combustion chamber so as to preheat the combustion air and exhausting a combustion exhaust gas flow through a second part of the regenerator to heat the second part; feeding a fuel to the combustion air to generate a combustion reaction in said combustion chamber to take a radiant heat transfer action on water tubes arranged in a periphery of the combustion chamber; splitting a downward combustion gas flow in a lower area of the combustion chamber into a first gas flow upwardly flowing in the combustion chamber and a second gas flow introduced through a first opening into a convection heat transfer section, so that the second gas flow upwardly passes through said convection heat transfer section, wherein said first opening is formed between lower portions of the water tubes and said convection heat transfer section is formed between the water tubes and a wall surface of the boiler body; introducing said second gas flow into said combustion chamber through a second opening, which is formed between upper portions of said water tubes, whereby a temperature of an upper area of the combustion chamber is lowered by a recirculation of said second gas flow flowing out from the second opening; and introducing the combustion air flow through said second part of said regenerator into said combustion chamber so as to preheat the combustion air and exhausting the combustion exhaust gas flow through said first part of the regenerator to heat the first part.

15. A method according to claim 14, wherein a changeover of the step of introducing the combustion air flow through said first part and the step of introducing the combustion air flow through the second part is performed in a predetermined interval time set to be no greater than 90 seconds.

16. A method according to claim 14, wherein the combustion air is preheated up to a temperature range above 700° C.

17. A method according to claim 14, wherein the combustion air is preheated up to a temperature range above a self-ignition temperature of the fuel.

18. A method according to claim 14, wherein said fuel is injected in a direction parallel with the preheated combustion air flow by means of an injection nozzle positioned at a center of the combustion chamber.

19. A method according to claim 18, wherein said combustion air flow is introduced into the combustion chamber from one of inlet/outlet positioned radially outward of said injection nozzle, and the inlet/outlet to be used for introducing the combustion air flow is changed over successively.

* * * * *